(12) United States Patent
Yang

(10) Patent No.: US 11,772,619 B2
(45) Date of Patent: Oct. 3, 2023

(54) ESTIMATED-ACCELERATION DETERMINATION FOR AUTOMATIC EMERGENCY BRAKING

(71) Applicant: Aptiv Technologies Limited, St. Michael (BB)

(72) Inventor: Mingda Yang, Rochester Hills, MI (US)

(73) Assignee: Aptiv Technologies Limited, St. Michael (BB)

( * ) Notice: Subject to any disclaimer, the term of this patent is extended or adjusted under 35 U.S.C. 154(b) by 157 days.

(21) Appl. No.: 17/468,409

(22) Filed: Sep. 7, 2021

(65) Prior Publication Data

US 2023/0070314 A1    Mar. 9, 2023

(51) Int. Cl.
*B60T 8/58* (2006.01)
*B60T 7/22* (2006.01)

(52) U.S. Cl.
CPC .......... *B60T 8/58* (2013.01); *B60T 7/22* (2013.01); *B60T 2201/022* (2013.01); *B60T 2201/03* (2013.01); *B60T 2210/32* (2013.01); *B60T 2250/04* (2013.01)

(58) Field of Classification Search
CPC ........ B60T 8/58; B60T 7/22; B60T 2201/022; B60T 2201/03; B60T 2210/32; B60T 2250/04
See application file for complete search history.

(56) References Cited

U.S. PATENT DOCUMENTS

| 8,694,222 | B2 | 4/2014 | Zagorski | |
| 2004/0193374 | A1* | 9/2004 | Hac | G08G 1/166 |
| | | | | 701/301 |
| 2013/0110368 | A1* | 5/2013 | Zagorski | B60T 7/22 |
| | | | | 701/70 |
| 2016/0244036 | A1* | 8/2016 | Ike | B60T 8/3275 |
| 2017/0072954 | A1 | 3/2017 | Nemoto | |

FOREIGN PATENT DOCUMENTS

| CN | 112455404 A | 3/2021 |
| EP | 3689696 A1 | 8/2020 |

OTHER PUBLICATIONS

"Extended European Search Report", EP Application No. 22182788.4, dated Jan. 17, 2023, 8 pages.

* cited by examiner

*Primary Examiner* — Rachid Bendidi
*Assistant Examiner* — Andrew J Cromer
(74) *Attorney, Agent, or Firm* — Sawtooth Patent Group PLLC

(57) ABSTRACT

The techniques and systems herein enable estimated-acceleration determination for AEB. Specifically, for a potential collision, a determination is made as to whether the target of the potential collision is likely to be stopped prior to the potential collision (e.g., due to its own braking). One of a plurality of estimated-acceleration functions is then selected based on whether the target is likely to be stopped prior to the potential collision. Using the selected estimated-acceleration function, an estimated acceleration to avoid the potential collision is calculated. By selecting different estimated-acceleration functions based on whether targets are likely to be stopped prior to potential collisions, more-accurate estimated accelerations may be generated, thus enabling better collision avoidance and/or avoiding unnecessarily strong braking.

17 Claims, 5 Drawing Sheets

ESTIMATED-ACCELERATION DETERMINATION FOR AUTOMATIC EMERGENCY BRAKING

BACKGROUND

Driver-assistance technologies are being developed and integrated in vehicles to increase safety. Automatic emergency braking (AEB) is one driver-assistance technology that enables vehicles to automatically slow or stop to avoid collisions with other vehicles or objects. Application of AEB (e.g., how much braking is applied by vehicles) is generally based on estimated accelerations (more specifically, decelerations) needed to avoid potential collisions. For example, some potential collisions necessitate a high amount of deceleration that causes an application of a high braking force, while others necessitate a low amount of deceleration that causes an application of a low braking force. Traditional functions for determining estimated accelerations are often based on simple kinetic equations (e.g., using relative velocity and distance) that are unable to account for other contexts, such as when a target is accelerating/decelerating. While they may work in some specific situations, without accounting for the other contexts, traditional functions are unable to determine accurate estimated accelerations in a wide variety of environments and situations. Under certain circumstances, miscalculating estimated accelerations can lead to delayed or insufficient braking inputs that can cause the vehicles to not effectively avoid the collisions. While under other circumstances, miscalculating estimated acceleration can also lead to premature or unnecessary application of braking inputs, which may be uncomfortable and frustrating for a driver and passengers, and may impact safety of other vehicles in traffic that are not anticipating these seemingly unnecessary brake events.

SUMMARY

This document is directed to systems and techniques for enabling estimated-acceleration determination for AEB Some aspects described below include a method. The method includes determining whether a target that is in a path of a host vehicle is likely to be stopped prior to a potential collision between the host vehicle and the target. The method also includes selecting, based on whether the target is likely to be stopped prior to the potential collision, an estimated-acceleration function from a plurality of estimated-acceleration functions. The method further includes calculating, using the selected estimated-acceleration function, an estimated acceleration of the host vehicle to avoid the potential collision.

Other aspects described below include systems and components with means (e.g., processing systems) for performing the above and other described methods. Further aspects described below include a computer-readable storage medium that includes instructions that, when executed, cause one or more processors, systems, or components to perform the above and other described methods.

This Summary introduces simplified concepts for enabling estimated-acceleration determination for AEB that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques for enabling an estimated-acceleration determination for AEB are described with reference to the following drawings that use some of the same numbers throughout to reference like or examples of like features and components.

DETAILED DESCRIPTION

Overview

AEB enables vehicles to determine that collisions with objects are imminent and provide braking forces to avoid the collisions. The braking forces are generally based on estimated accelerations (e.g., accelerations needed to avoid potential collisions). The estimated accelerations are often based on simple calculations that are applied no matter the scenario, or in other words, the calculations are situation-independent. For example, a braking target may necessitate a stronger braking input than an accelerating target (assuming the target is moving in the same direction as the vehicle). Without accounting for the scenario, or said differently, without addressing the context surrounding a potential collision, estimated accelerations (and consequently braking inputs) are often misestimated, thus leading to under- or over-braking. Under-braking can cause collisions, while over-braking can likewise cause collisions (e.g., from behind) or at least, may be annoying for drivers and passengers. Accordingly, accurate calculation of estimated accelerations in a wide variety of environments and situations is important in ensuring that AEB functions as designed.

The techniques and systems herein enable estimated-acceleration determination for AEB Specifically, for a potential collision, a determination is made as to whether the target of the potential collision is likely to be stopped prior to the potential collision (e.g., due to its own braking). One of a plurality of estimated-acceleration functions is then selected based on whether the target is likely to be stopped prior to the potential collision. Using the selected estimated-acceleration function, an estimated acceleration to avoid the potential collision is calculated. By selecting different estimated-acceleration functions based on whether targets are likely to be stopped prior to potential collisions, more-accurate estimated accelerations may be generated, thus enabling better collision avoidance and/or avoiding unnecessarily strong braking

Example Environment

Figure 1:
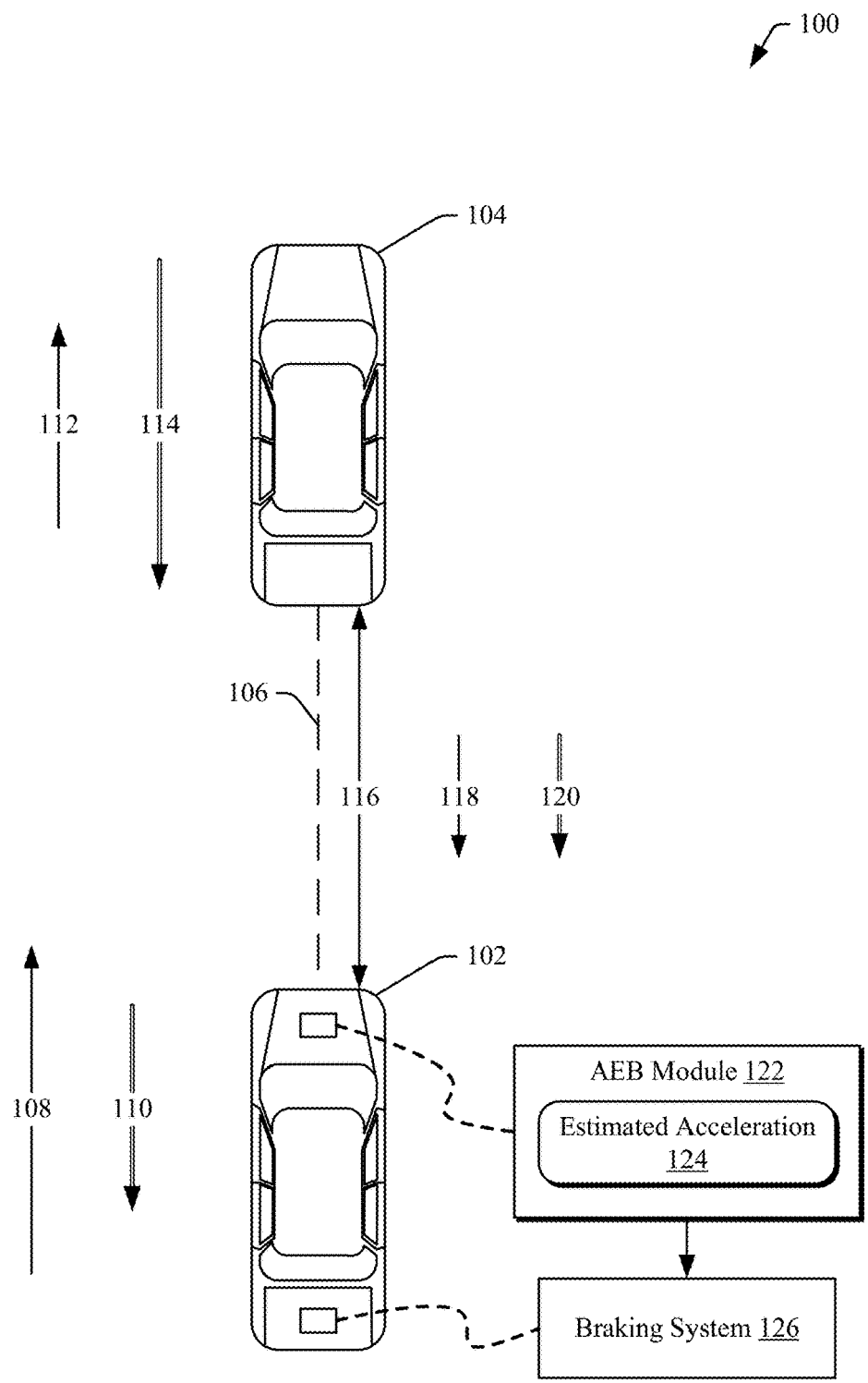
FIG. 1 illustrates an example environment where an estimated-acceleration determination for AEB may be used, in accordance with techniques of this disclosure.

FIG. 1 illustrates an example environment 100 where estimated-acceleration determination for AEB may be used. The environment 100 contains a host vehicle 102 and a target 104 that is in a path 106 of the host vehicle 102. Although shown as straight, the path 106 may be curved or include any other shape. The host vehicle 102 may be any type of system with autonomous braking or collision avoidance capability (automobile, car, truck, motorcycle, e-bike, boat, air vehicle, and so on). The target 104 may be any type of moving or stationary object (automobile, car, truck, motorcycle, e-bike, boat, pedestrian, cyclist, boulder, and so on).

The host vehicle 102 is traveling with a host velocity 108 toward the target 104 and accelerating with a host acceleration 110. The host velocity 108 is greater than zero because no potential collision would exist (or at least one that is mitigable by AEB) if the host vehicle 102 were stopped or moving away from the target 104. The host acceleration 110 may be negative (e.g., the host vehicle 102 is slowing), zero (e.g., the host vehicle 102 is moving at a steady speed), or positive (e.g., the host vehicle 102 is accelerating). A positive host acceleration 110 indicates that the host vehicle 102 is accelerating, while a negative host acceleration 110 indicates that the host vehicle 102 is decelerating.

The target 104 is traveling with a target velocity 112 and accelerating with a target acceleration 114. The target velocity 112 may be negative (e.g., the target 104 is moving toward the host vehicle 102), zero (e.g., the target 104 is stationary), or positive (e.g., the target 104 is moving away from the host vehicle 102). The target acceleration 114 may also be negative, zero, or positive. A positive target acceleration 114 indicates an increasing speed when the target velocity 112 is positive or a decreasing speed when the target velocity 112 is negative. Conversely, a negative value indicates a decreasing speed when the target velocity 112 is positive or an increasing speed when the target velocity 112 is negative. A target acceleration 114 of zero indicates that the target 104 is traveling at a constant speed (including staying at a speed of zero in the case of a stationary target).

A relative distance 116 exists between the host vehicle 102 and the target 104. Also, a relative velocity 118 exists that equals the target velocity 112 minus the host velocity 108 (sign-dependent). Similarly, a relative acceleration 120 exists that equals the target acceleration 114 minus the host acceleration 110 (also sign-dependent). The relative velocity 118 and the relative acceleration may be positive or negative depending on a particular situation.

In the example illustration 100, the vector direction is based on the positive/negative convention discussed above (e.g., up corresponds to positive and down corresponds to negative as the host vehicle 102 is traveling up), and the directions are shown for illustrative purposes only. For example, in the example illustration 100, the host acceleration 110 and the target acceleration 114 are both negative (e.g., the host vehicle 102 and the target 104 are decelerating while traveling in the same direction).

The magnitudes of the respective vectors are shown for illustration purposes only. For example, in the illustrated example, the relative acceleration 120 happens to be negative because the target acceleration 114 is negative and has a larger magnitude than the host acceleration 110 that is also negative. The conventions used may differ without departing from the scope of the disclosure.

The host vehicle includes an AEB module 122 that is implemented at least partially in hardware (e.g., a combination of software or firmware executing on hardware, a pre-programmed field-programmable-gate-array (FPGA), system on chip (SOC), and the like. The AEB module 122 is configured to determine an estimated acceleration 124 for the host vehicle 102 to avoid a potential collision with the target 104 (assuming there is a potential collision). For example, the AEB module 122 may determine the potential collision or receive an indication of the potential collision (e.g., from another module or system) and calculate the estimated acceleration 124 needed to avoid the collision. The estimated acceleration 124 may be calculated one of a plurality of ways based on whether the target 104 will likely come to a stop before the potential collision. The calculation of the estimated acceleration 124 is described further in regard to FIG. 4.

An activation signal based on the estimated acceleration 124 is then sent to a braking system 126 of the host vehicle 102 that applies a braking force to slow the host vehicle 102. The braking force is based on the estimated acceleration 124 and is effective to avoid, or at least attempt to avoid, the potential collision with the target 104.

By utilizing the techniques described herein, the host vehicle 102 is able to calculate the estimated acceleration 124 for AEB more accurately. In doing so, delayed or insufficient braking inputs or, conversely, premature or unnecessarily strong applications of AEB may be avoided in many situations, including situations where a traditional AEB activation may otherwise occur.

Example Host Vehicle Configuration

Figure 2:
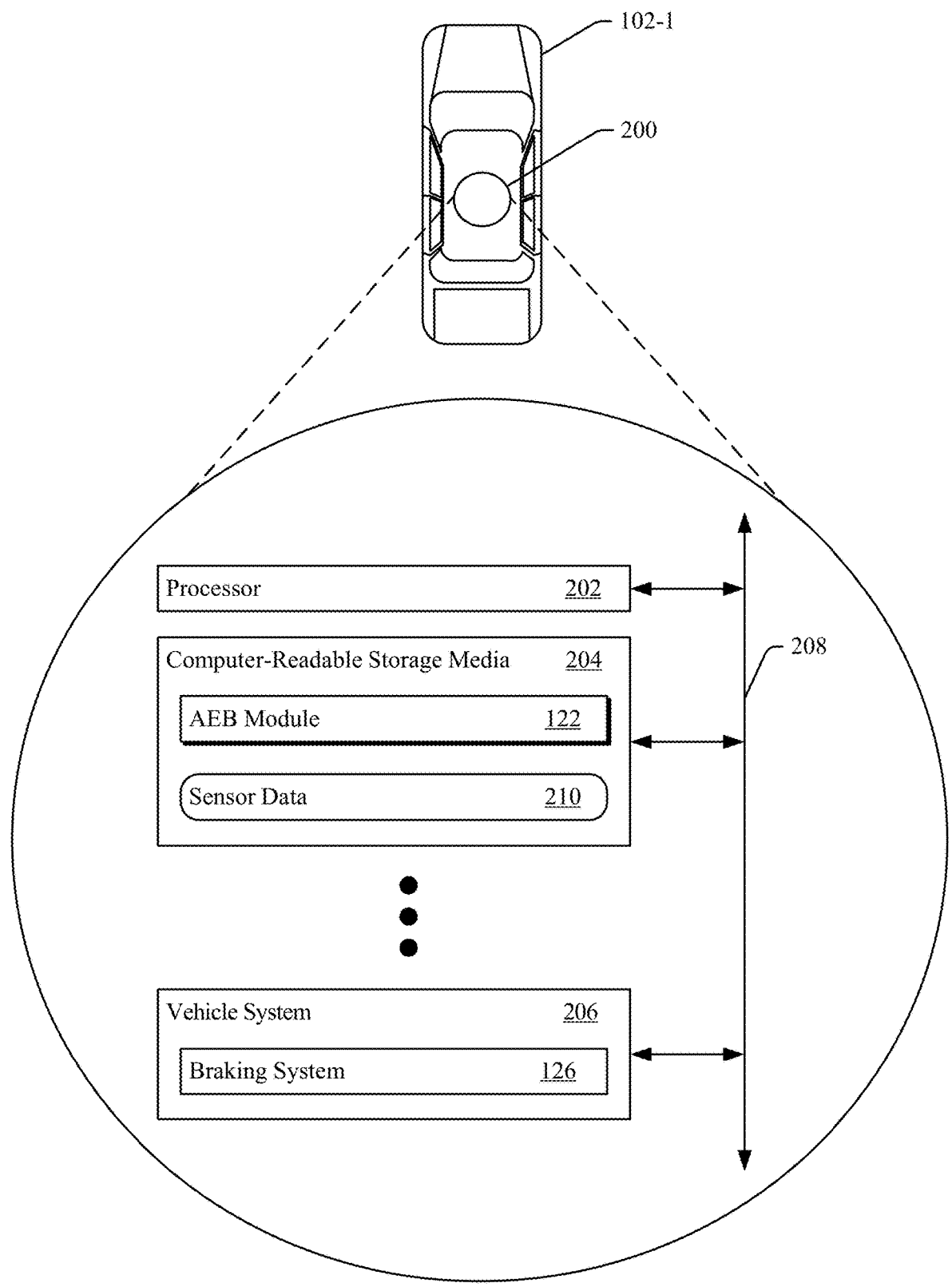
FIG. 2 illustrates an example system of a host vehicle configured to determine an estimated acceleration for AEB, in accordance with techniques of this disclosure.

FIG. 2 illustrates an example system 200 of a host vehicle 102-1, which is an example of the host vehicle 102. Components of the system 200 may be arranged anywhere within or on the host vehicle 102-1. The system 200 may include at least one processor 202, at least one computer-readable storage media 204, and at least one vehicle system 206. The components are operatively and/or communicatively coupled via a link 208.

The processor 202 (e.g., application processor, microprocessor, digital-signal processor (DSP), controller) is coupled to the computer-readable storage media 204 via link 208 and executes instructions (e.g., code) stored within the computer-readable storage media 204 (e.g., non-transitory storage device such as a hard drive, SSD, flash memory, read-only memory (ROM)) to implement or otherwise cause the AEB module 122 (or a portion thereof) to perform the techniques described herein. The processor 202 and the computer-readable storage media 204 may be any number of components, comprise multiple components distributed throughout the host vehicle 102-1, located remote to the host vehicle 102-1, dedicated or shared with other components, modules or systems of the host vehicle 102-1, and/or configured differently than illustrated without departing from the scope of this disclosure. Although shown as being within the computer-readable storage media 204, the AEB module 122 may be a stand-alone component.

The computer-readable storage media 204 contains sensor data 210 generated by one or more sensors (not shown) that may be local or remote to the host vehicle 102-1. The sensor data 210 indicates or otherwise enables the determination of the attributes of the environment 100 described in FIG. 1 and referred to below. For example, a speedometer may generate sensor data indicating the host velocity 108, an accelerometer may generate sensor data indicating the host acceleration 110, and/or a ranging sensor (e.g., radar, lidar, stereoscopic optical sensor) may generate sensor data indicating the target velocity 112, the target acceleration 114, and/or the relative distance 116.

In some implementations, the sensor data 210 may come from a remote source (e.g., via link 208. The host vehicle 102-1 may contain a communication system (not shown) that receives sensor data from the target 104 or another remote source. For example, a vehicle-to-vehicle (V2V) or vehicle-to-everything (V2X) communication system may be used to obtain attributes of the target 104 (e.g., the target velocity 112, the target acceleration 114).

The vehicle system 206 contains systems or components that are configured to affect respective dynamics of the host vehicle 102-1 (e.g., speed, acceleration, heading, vehicle configuration, vehicle operation or function). The vehicle system 206 is communicatively coupled to the AEB module 122 via the link 208 and may also be communicatively coupled to one or more other modules (e.g., cruise-control module, semi-autonomous or autonomous driving module, parking module). The vehicle system 206 contains the braking system 126 that is configured to apply braking inputs to slow the host vehicle 102-1.

The braking system 126 may be any type of system known by those of ordinary skill in the art to apply braking inputs to slow the host vehicle 102-1 in combination with, or in lieu of, driver input. For example, the braking system 126 may be a hydraulic, pneumatic, or electric braking system or some combination thereof that receives an activation signal (e.g., one based on the estimated acceleration 124) and applies braking forces that oppose a present trajectory of the host vehicle 102-1 based on the estimated acceleration 124.

By using the systems described herein, the host vehicle 102-1 may generate more accurate estimated accelerations and, thus, cause the braking system 126 to apply braking inputs more accurately. In doing so, more potential collisions can be avoided (e.g., by applying more braking input than conventional techniques). Conversely, false or unnecessarily strong braking inputs may also be avoided (e.g., by applying less braking input than conventional techniques).

Example Data Flow

Figure 3:
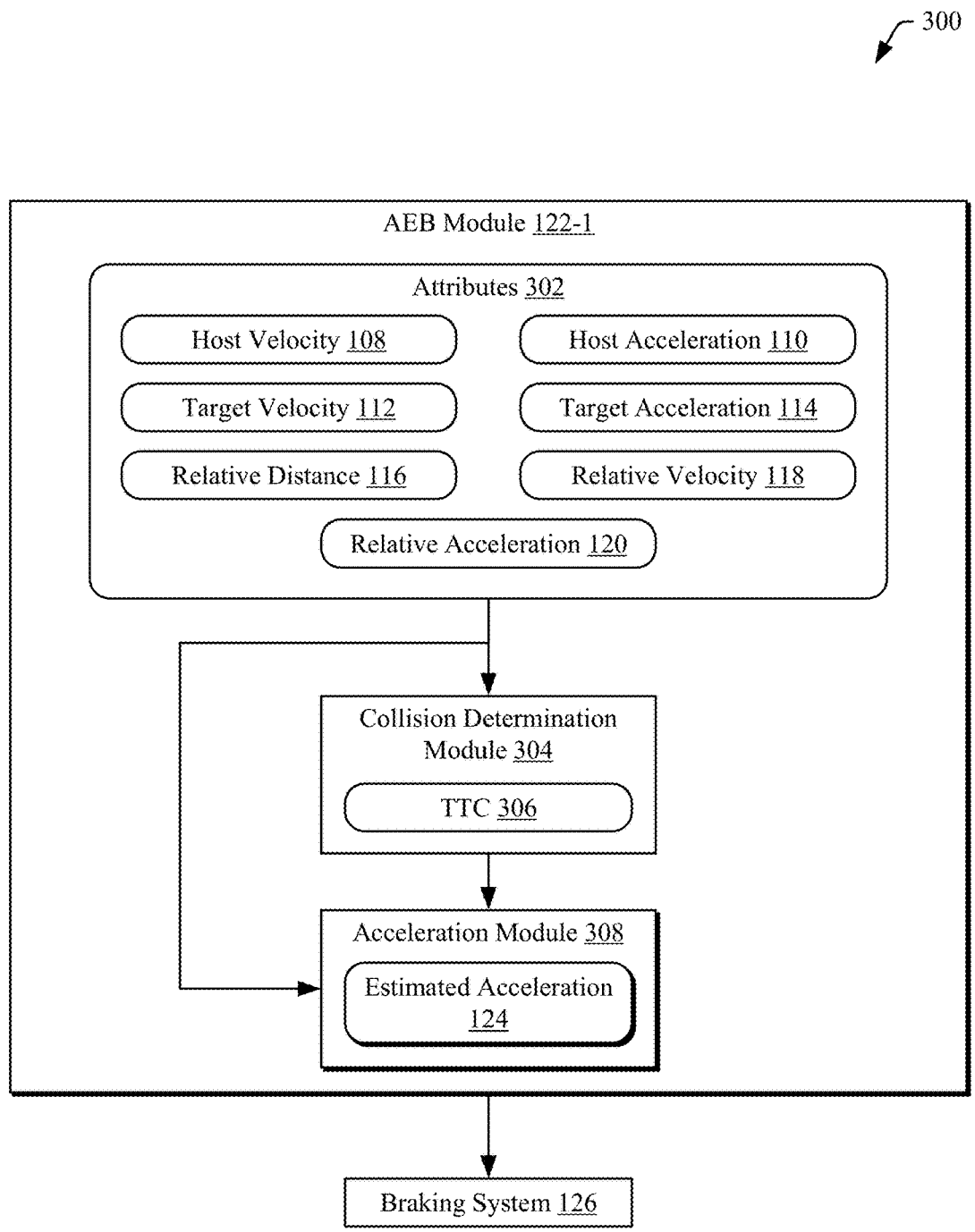
FIG. 3 illustrates an example execution path for an estimated-acceleration determination for AEB, in accordance with techniques of this disclosure.

FIG. 3 is an example execution path 300 for an estimated-acceleration determination for AEB The execution path 300 is generally implemented during execution or operation of an AEB module 122-1, which is an example of the AEB module 122 (or a portion thereof), for example, by the at least one processor 202.

The execution path 300 starts with attributes 302 of the host vehicle 102 and the target 104, including those discussed in regard to FIG. 1, being obtained by the AEB module 122-1. As shown, the attributes 302 include the host velocity 108, the host acceleration 110, the target velocity 112, the target acceleration 114, the relative distance 116, the relative velocity 118, and the relative acceleration 120. The attributes 302 may be acquired, received, or determined by the AEB module 122-1 in any way known by those of ordinary skill in the art. For example, the AEB module 122-1 may determine some of the attributes 302 directly from the sensor data 212, from a bus or interface connected to sensors that interface with the vehicle system 206, or from another module or system connected to the vehicle system 206. Some of the attributes 302 may be derived (e.g., the relative velocity 118 and relative acceleration 120) by the AEB module 122-1 or another module or system. Regardless of how or where the attributes 302 are gathered, received, derived, or calculated, the AEB module 122-1 is configured to use the attributes 302 to determine the estimated acceleration 124.

In furtherance of the execution path 300, the attributes 302 are input to a collision determination module 304 of the AEB module 122-1. The collision determination module 304 may, in some implementations, be separate from the AEB module 122. The determination module 304 determines from the attributes 302 whether a potential collision exists between the host vehicle 102 and the target 104. Determination of the potential collision may be by any techniques known by one of ordinary skill the art. The determination module 304 determines a time-to-collision (TTC 306) calculated from the attributes 302, which is a measure of time before a collision between the host vehicle 102 and the target 104 being less than a threshold.

An acceleration module 308 of the AEB module 122-1, which is implemented at least partially in hardware, receives the TTC 306 from the collision determination module 304 and the attributes 302 and calculates the estimated acceleration 124 to avoid the potential collision. Although shown as being within the AEB module 122-1, the acceleration module 308 may be a stand-alone component, separate from the AEB module 122-1, and/or executed via dedicated hardware.

The acceleration module 308 may refrain from calculating, and therefore, not calculate, the estimated acceleration 124 until it determines that a potential collision with the target 104 exists. The determination may be based on receiving the TTC 306 from the collision determination module 304 (e.g., the collision determination module 304 only outputs the TTC 306 when the potential collision exists), checking an indicator of the potential collision (e.g., a bit or register value) and obtaining the TTC 306 based on the indicator, or getting a signal from the AEB module 122 (or collision determination module 304) indicating the potential collision. In other words, the acceleration module 308 may not calculate the estimated acceleration 124 unless the potential collision exists (unless it is used to determine whether the potential collision exists). In this way, the acceleration module 308 can minimize unnecessary computational overhead.

The acceleration module 308 may utilize one of a plurality of functions to calculate the estimated acceleration 124 based on whether the target 104 is projected to stop prior to the potential collision. The calculation of the estimated acceleration 124 is discussed further in regard to FIG. 4. The acceleration module 308 can then output the estimated acceleration 124 for use in applying AEB.

In order to activate/apply AEB for the potential collision, the AEB module 122-1 (e.g., the collision determination module 304 or the acceleration module 308) provides an activation signal to the braking system 126 that causes the braking system 126 to apply a braking force based on the estimated acceleration 124. It is noted that the estimated acceleration 124 is relative to the ground. Because the host vehicle 102 may have a host acceleration 110 that is not zero, an acceleration to be caused by the braking system 126 may be more or less than the estimated acceleration 124. More specifically, the acceleration to be caused by the braking system 126 may equal the estimated acceleration 124 minus the host acceleration 110. As such, the activation signal may contain the acceleration to be caused by the braking system 126 (e.g., the estimated acceleration 124 minus the host acceleration 110). Furthermore, the activation signal may comprise a pointer to the acceleration to be caused by the braking system 126 and/or a plurality of values (e.g., a ramp or step function) corresponding to the acceleration to be caused by the braking system 126. In some implementations, the estimated acceleration 124 may be output to the braking system 126 such that the braking system 126 can determine the actual braking inputs needed.

By calculating the estimated acceleration 124 using the TTC 306 and the attributes, 302 the acceleration module 308 is able to accurately determine the estimated acceleration 124. More specifically, by determining whether the target 104 is likely to stop prior to the potential collision, the acceleration module 308 can calculate the estimated acceleration 124 using one of a plurality of ways. In doing so, the estimated acceleration 124 becomes more accurate in a wider range of scenarios, which leads to increased safety for occupants of the host vehicle 102 as well as the target 104.

Estimated Acceleration Calculation

Figure 4:
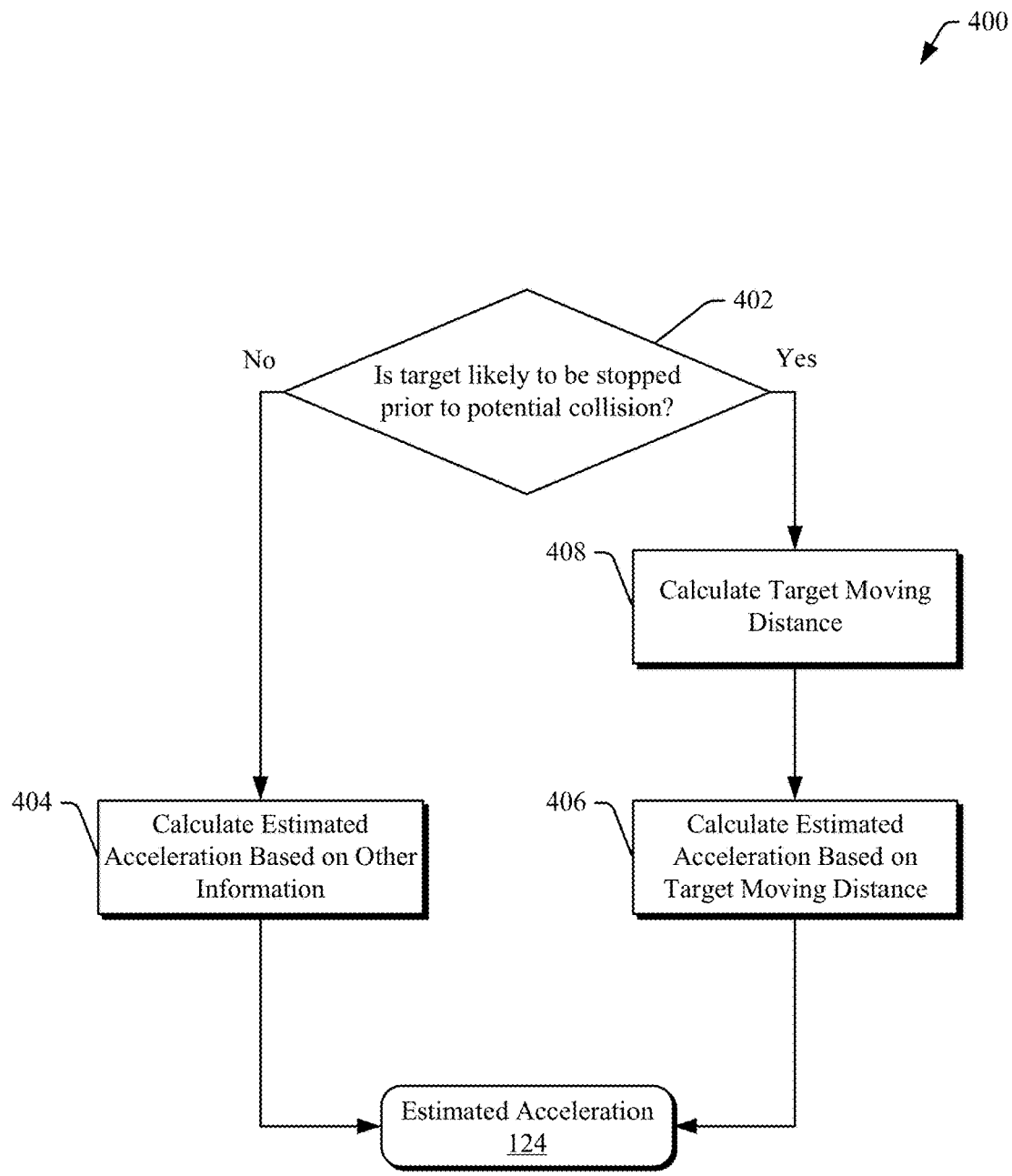
FIG. 4 illustrates a flow chart of example logic for determining an estimated acceleration, in accordance with techniques of this disclosure.

FIG. 4 illustrates a flow chart 400 of logic for calculating the estimated acceleration 124. FIG. 4 is described in the context of the AEB module 122-1. When executed, the logic shown in the flow chart 400 causes the acceleration module 308 to receive the attributes 302 and the TTC 306 to calculate the estimated acceleration 124.

To do so, the acceleration module 308 determines, at decision 402, whether the target 104 is likely to stop prior to the potential collision. For example, the acceleration module 308 may determine a time-to-stop (TTS) for the target 104 (e.g., an estimated time until the target 104 is stationary) and determine if it is less than the TTC 306. Equation 1 is an example of such a comparison.

$$TTS = \left| \frac{v_T}{a_T} \right| < TTC \tag{1}$$

In Equation 1, TTS is the time-to-stop for the target 104, $v_T$ is the target velocity 112, $a_T$ is the target acceleration 114, and the TTC is the TTC 306 for the potential collision.

If the TTS is less than the TTC 306, then it can be assumed that the target 104 will stop prior to the potential collision (e.g., provides a "yes" out of decision 402). If the TTS is greater than the TTC 306, then it can be assumed that the target 104 will not stop prior to the potential collision (e.g., provides a "no" out of decision 402).

It is noted that if the target 104 is moving at a steady non-zero speed or accelerating (e.g., the target velocity 112 is non-zero while target acceleration 114 is zero or positive), then the TTS will be positive infinite, which is greater than the TTC 306, which leads to a "no" decision out of decision 402. For such targets, instead of using Equation 1, the acceleration module 308 may simply jump to the "no" decision out of decision 402 (assuming the potential collision exists). In other words, in some implementations, Equation 1 may only be used when the target 104 is not moving at a steady non-zero speed or not accelerating (assuming the potential collision exists).

It is also noted that if the target 104 is stationary (e.g., the target velocity 112 is zero), then the TTS will be zero, which is less than the TTC 306, which leads to a "yes" decision out of decision 402. For such targets, instead of using Equation 1, the acceleration module 308 may simply jump to the "yes" decision out of decision 402 (assuming the potential collision exists). In other words, in some implementations, Equation 1 may only be used when the target 104 is not stationary (assuming the potential collision exists).

Responsive to determining that the target 104 will not stop prior to the potential collision (e.g., a "no" out of decision 402), the acceleration module 308 may calculate the estimated acceleration 124 based on Equation 2 (e.g., at 404).

$$a_{req} = -\frac{v_r^2}{2*|s - s_{safe}|} + a_t \tag{2}$$

In Equation 2, $a_{req}$ is the estimated acceleration 124, $v_r$ is the relative velocity 118, s is the distance 116, $s_{safe}$ is a safe distance between the host vehicle 102 and the target 104 (e.g., if it were zero, the host vehicle 102 would theoretically stop touching the target 104), and $a_t$ is the target acceleration 114.

Responsive to determining that the target 104 will stop prior to the potential collision (e.g., a "yes" out of decision 402), the acceleration module 308 may calculate the estimated acceleration 124 based on Equation 3 (e.g., at 406).

$$a_{req} = -\frac{v_h^2}{2*|s + s_{target\ move} - s_{safe}|} \tag{3}$$

In Equation 3, $a_{req}$ is the estimated acceleration 124, $v_h$ is the host velocity 108, s is the distance 116, $s_{safe}$ is the safe distance between the host vehicle 102 and the target 104, and $s_{target\ move}$ is a distance the target 104 is estimated to travel prior to being stopped and may be calculated using Equation 4 (e.g., at 408).

$$s_{target\ move} = -\frac{v_t^2}{2*|a_r|} \tag{4}$$

It is noted that if the target 104 is stationary (e.g., the target velocity 112 is zero), then Equation 4 may not be used or may otherwise be bypassed. For example, when the target velocity 112 is zero, the $s_{target\ move}$ is zero. Instead of calculating the zero value, the acceleration module 308 may simply assign a zero to the $s_{target\ move}$. In other words, Equation 4 may only be used when the target 104 is not stopped (assuming the target has been determined to stop prior to the potential collision).

As discussed above, the host velocity 108 is positive. As such, regardless of how it is calculated, the estimated acceleration 124 is negative since the desired effect of AEB is slowing the host vehicle 102 to avoid the potential collision with the target 104.

By using the above techniques, different functions may be used to calculate the estimated acceleration 124 based on whether or not the target 104 is likely to be stopped prior to the potential collision. In this way, the estimated acceleration 124 may be more accurate in a wider variety of situations. More-accurate estimated accelerations can lead to decreased collisions (e.g., by applying more braking input than conventional techniques) and/or decreased false or unnecessarily strong braking inputs (e.g., by applying less braking input than conventional techniques).

Example Method

Figure 5:
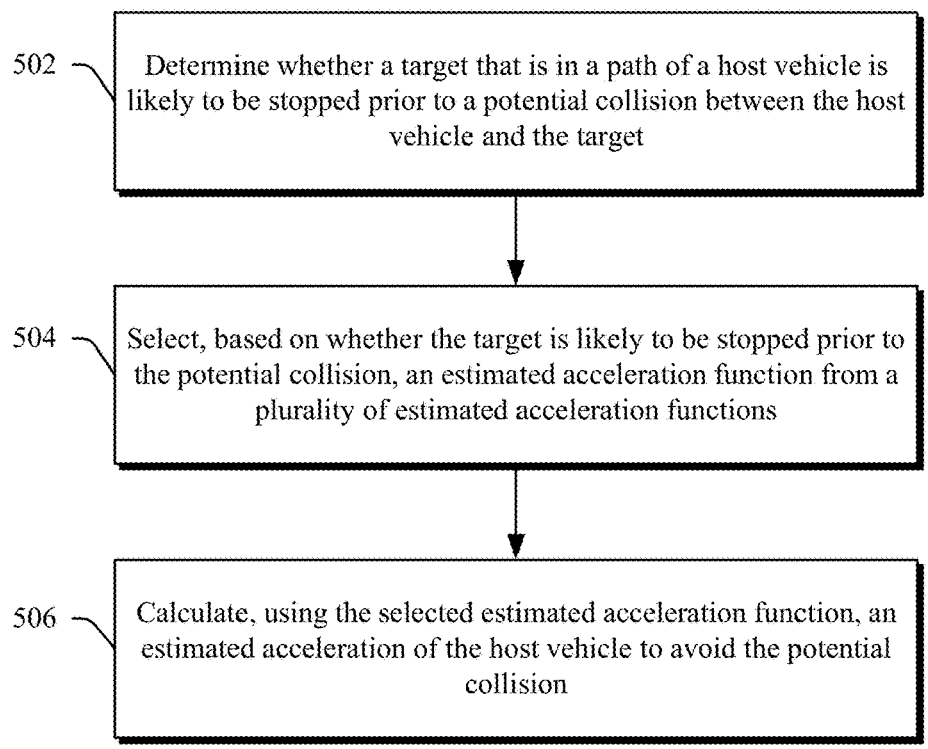
FIG. 5 illustrates an example process of an estimated-acceleration determination for AEB, in accordance with techniques of this disclosure.

FIG. 5 is an example process 500 of an estimated-acceleration determination for AEB The process 500 may be implemented in any of the previously described examples and utilizing techniques the above-mentioned techniques. For example, the process 500 can be implemented in the example environment 100, by the host vehicle 102, 102-1, and the system 200, by following the execution path 300, and/or executing the logic of the flow chart 400. Operations 502 through 506 may be performed by one or more entities (e.g., portions of the host vehicle 102, 102-1 such as the AEB module 122, 122-1 and/or the acceleration module 308). The order in which the operations are shown and/or described is not intended to be construed as a limitation, and any number or combination of the operations can be combined in any order to implement the example method or an alternate method.

At 502, a determination is made as to whether a target that is in a path of a host vehicle is likely to be stopped prior to a potential collision between the host vehicle and the target. For example, the acceleration module 308 may receive the attributes 302 and the TTC 306 for the potential collision, determine the TTS for the target 104, and compare the TTS to the TTC 306. If the TTS is less than the TTC 306, then the acceleration module 308 may determine that the target 104 will be stopped prior to the potential collision. If the TTS is not less than the TTC 306, then the acceleration module 308 may determine that the target 104 will not be stopped prior to the potential collision.

At 504, an estimated-acceleration function is selected from a plurality of estimated-acceleration functions based on whether the target is likely to be stopped prior to the potential collision. For example, the acceleration module 308 may select a function based on Equation 2 responsive to determining that the target is not likely to be stopped prior to the potential collision. Alternatively, the acceleration module 308 may select another function based on Equation 3 (and Equation 4) responsive to determining that the target is likely to be stopped prior to the potential collision.

At 506, an estimated acceleration of the host vehicle to avoid the potential collision is calculated. For example, the acceleration module 308 may calculate the estimated acceleration 124 based on Equation 2 when it has been determined that the target is not likely to be stopped prior to the potential collision. The acceleration module 308 may calculate the estimated acceleration 124 based on Equation 3 when it has been determined that the target is likely to be stopped prior to the potential collision.

By determining whether the target is likely to be stopped prior to the potential collision and calculating the estimated acceleration 124 based on the determination, the estimated acceleration 124 may be more accurate in a wider array of situations and environments. In doing so, insufficient (e.g., to avoid a collision) and/or unnecessarily strong braking inputs by AEB systems may be avoided in a wide variety of environments and situations.

EXAMPLES

Example 1: A method comprising: determining whether a target that is in a path of a host vehicle is likely to be stopped prior to a potential collision between the host vehicle and the target; selecting, based on whether the target is likely to be stopped prior to the potential collision, an estimated-acceleration function from a plurality of estimated-acceleration functions; and calculating, using the selected estimated-acceleration function, an estimated acceleration of the host vehicle to avoid the potential collision.

Example 2: The method as recited in example 1, wherein the determining whether the target is likely to be stopped prior to the potential collision comprises determining whether a time-to-stop for the target is less than a time-to-collision for the potential collision.

Example 3: The method as recited in example 2, wherein the time-to-stop for the target is based on a velocity of the target and an acceleration of the target.

Example 4: The method as recited in any of examples 1 to 3: wherein the determining whether the target is likely to be stopped prior to the potential collision comprises determining whether the target is: moving at a steady non-zero velocity or accelerating; or stationary.

Example 5: The method as recited in any of examples 1 to 4, wherein the plurality of estimated-acceleration functions comprises: a first estimated-acceleration function based on a relative velocity between the host vehicle and the target, a distance between the host vehicle and the target, and an acceleration of the target; and a second estimated-acceleration function based on a velocity of the host vehicle, the distance between the host vehicle and the target, and a distance the target is estimated to travel prior to being stopped.

Example 6: The method as recited in example 5, wherein the distance the target is estimated to travel prior to being stopped is based on a velocity of the target.

Example 7: The method as recited in example 6, wherein the distance the target is estimated to travel prior to being stopped is based further on a relative acceleration between the host vehicle and the target.

Example 8: The method as recited in example 6 or 7, wherein the distance the target is estimated to travel prior to being stopped is zero when the velocity of the target is zero.

Example 9: The method as recited in any of examples 1 to 8, further comprising causing an automatic emergency braking (AEB) system of the host vehicle to apply a braking force based on the estimated acceleration of the host vehicle.

Example 10: The method as recited in example 9, wherein the braking force is based further on an acceleration of the host vehicle.

Example 11: A system comprising: at least one processor configured to: determine whether a target that is in a path of a host vehicle is likely to be stopped prior to a potential collision between the host vehicle and the target; select a first estimated-acceleration function responsive to determining that the target is not likely to be stopped prior to the potential collision; select a second estimated-acceleration function responsive to determining that the target is likely to be stopped prior to the potential collision; and calculate, using the first or second estimated-acceleration function, an estimated acceleration of the host vehicle to avoid the potential collision.

Example 12: The system as recited in example 11, wherein the determination of whether the target is likely to be stopped prior to the potential collision comprises a determination of whether a time-to-stop for the target is less than a time-to-collision for the potential collision.

Example 13: The system as recited in example 12, wherein the time-to-stop for the target is based on a velocity of the target and an acceleration of the target.

Example 14: The system as recited in any of examples 11 to 13, wherein the processor is further configured to: determine that the target is not likely to be stopped prior to the potential collision based on determining that the target is moving at a steady non-zero speed or accelerating; and determine that the target is likely to be stopped prior to the potential collision based on determining that the target is stationary.

Example 15: The system as recited in any of examples 11 to 14, wherein: the first estimated-acceleration function is based on a relative velocity between the host vehicle and the target, a distance between the host vehicle and the target, and an acceleration of the target; and the second estimated-acceleration function is based on a velocity of the host vehicle, the distance between the host vehicle and the target, and a distance the target is estimated to travel prior to being stopped.

Example 16: The system as recited in example 15, wherein the distance the target is estimated to travel prior to being stopped is based on a velocity of the target.

Example 17: The system as recited in example 16, wherein the distance the target is estimated to travel prior to being stopped is based further on a relative acceleration between the host vehicle and the target.

Example 18: The system as recited in example 16 or 17, wherein the distance the target is estimated to travel prior to being stopped is zero when the velocity of the target is zero.

Example 19: The system as recited in any of examples 11 to 18, wherein the processor is further configured to cause an automatic emergency braking (AEB) system of the host vehicle to apply a braking force based on the estimated acceleration of the host vehicle.

Example 20: A computer-readable storage medium comprising instructions that, when executed by at least one processor, cause the processor to: determine whether a target that is in a path of a host vehicle is likely to be stopped prior to a potential collision between the host vehicle and the target; select a first estimated-acceleration function responsive to determining that the target is not likely to be stopped prior to the potential collision; select a second estimated-acceleration function responsive to determining that the target is likely to be stopped prior to the potential collision; calculate, using the first or second estimated-acceleration function, an estimated acceleration of the host vehicle to avoid the potential collision; and output the estimated acceleration for use by an automatic emergency braking system in slowing the host vehicle to avoid the potential collision.

Example 21: A system comprising: a processor configured to perform the method of any of examples 1 to 10.

Example 22: A computer-readable storage medium comprising instructions that, when executed by at least one processor, cause the processor to perform the method of any of examples 1 to 10.

Example 23: A system comprising means for performing the method of any of examples 1 to 10.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
    calculating a time-to-collision for a potential collision between a host vehicle and a target that is in a path of the host vehicle;
    calculating a time-to-stop for the target;
    determining whether the time-to-stop for the target is less than the time-to-collision;
    selecting, based on whether the time-to-stop for the target is less than the time-to-collision, an estimated-acceleration function from a plurality of estimated-acceleration functions;
    calculating, using the selected estimated-acceleration function, an estimated acceleration of the host vehicle to avoid the potential collision; and
    causing an automatic emergency braking (AEB) system of the host vehicle to apply a braking force based on the estimated acceleration of the host vehicle.

2. The method as recited in claim 1, wherein the time-to-stop for the target is based on a velocity of the target and an acceleration of the target.

3. The method as recited in claim 1, wherein the plurality of estimated-acceleration functions comprises:
    a first estimated-acceleration function based on a relative velocity between the host vehicle and the target, a distance between the host vehicle and the target, and an acceleration of the target; and
    a second estimated-acceleration function based on a velocity of the host vehicle, the distance between the host vehicle and the target, and a distance the target is estimated to travel prior to being stopped.

4. The method as recited in claim 3, wherein the distance the target is estimated to travel prior to being stopped is based on a velocity of the target.

5. The method as recited in claim 4, wherein the distance the target is estimated to travel prior to being stopped is based further on an acceleration of the target.

6. The method as recited in claim 4, wherein the distance the target is estimated to travel prior to being stopped is zero when the velocity of the target is zero.

7. The method of claim 3, further comprising:
    selecting the first estimated-acceleration function responsive to determining that the time-to-stop is not less than the time-to-collision; and
    selecting the second estimated-acceleration function responsive to determining that the time-to-stop is less than the time-to-collision.

8. The method as recited in claim 1, wherein the braking force is based further on an acceleration of the host vehicle.

9. The method of claim 1, wherein the method is performed by the host vehicle.

10. A system comprising:
    at least one processor configured to:
        calculate a time-to-collision for a potential collision between a host vehicle and a target that is in a path of the host vehicle;
        calculate a time-to-stop for the target;
        determine whether the time-to-stop for the target is less than the time-to-collision;
        select a first estimated-acceleration function responsive to determining that the time-to-stop for the target is not less than the time-to-collision;
        select a second estimated-acceleration function responsive to determining that the time-to-stop for the target is less than the time-to-collision;
        calculate, using the first or second estimated-acceleration function, an estimated acceleration of the host vehicle to avoid the potential collision; and
        cause an automatic emergency braking (AEB) system of the host vehicle to apply a braking force based on the estimated acceleration of the host vehicle.

11. The system as recited in claim 10, wherein the time-to-stop for the target is based on a velocity of the target and an acceleration of the target.

12. The system as recited in claim 10, wherein the processor is further configured to:
- determine that the time-to-stop is not less than the time-to-collision based on determining that the target is moving at a steady non-zero speed or accelerating; and
- determine that the time-to-stop is less than the time-to-collision based on determining that the target is stationary.

13. The system as recited in claim 10, wherein:
- the first estimated-acceleration function is based on a relative velocity between the host vehicle and the target, a distance between the host vehicle and the target, and an acceleration of the target; and
- the second estimated-acceleration function is based on a velocity of the host vehicle, the distance between the host vehicle and the target, and a distance the target is estimated to travel prior to being stopped.

14. The system as recited in claim 13, wherein the distance the target is estimated to travel prior to being stopped is based on a velocity of the target.

15. The system as recited in claim 14, wherein the distance the target is estimated to travel prior to being stopped is based further on an acceleration of the target.

16. The system as recited in claim 14, wherein the distance the target is estimated to travel prior to being stopped is zero when the velocity of the target is zero.

17. A non-transitory computer-readable storage medium comprising instructions that, when executed by at least one processor, cause the processor to:
- calculate a time-to-collision for a potential collision between a host vehicle and a target that is in a path of the host vehicle;
- calculate a time-to-stop for the target;
- determine whether the time-to-stop for the target is less than the time-to-collision;
- select a first estimated-acceleration function responsive to determining that the time-to-stop for the target is not less than the time-to-collision;
- select a second estimated-acceleration function responsive to determining that the time-to-stop for the target is less than the time-to-collision;
- calculate, using the first or second estimated-acceleration function, an estimated acceleration of the host vehicle to avoid the potential collision; and
- cause an automatic emergency braking (AEB) system of the host vehicle to apply a braking force based on the estimated acceleration of the host vehicle.

\* \* \* \* \*